(12) United States Patent
Kakkori (10) Patent No.: US 7,412,158 B2
(45) Date of Patent: Aug. 12, 2008

(54) DEEPER DEPTH OF FIELD FOR VIDEO

(75) Inventor: Hannu Kakkori, Tampere (FI)

(73) Assignee: Nokia Corporation, Espoo (FI)

( * ) Notice: Subject to any disclaimer, the term of this patent is extended or adjusted under 35 U.S.C. 154(b) by 368 days.

(21) Appl. No.: 11/200,267

(22) Filed: Aug. 8, 2005

(65) Prior Publication Data

US 2007/0031136 A1   Feb. 8, 2007

(51) Int. Cl.
    *G03B 3/00*   (2006.01)
(52) U.S. Cl. .................. 396/89; 396/65; 359/666; 359/708; 359/721; 348/207.99
(58) Field of Classification Search .......... 396/89, 396/65; 359/666, 708, 721; 348/207.99
    See application file for complete search history.

(56) References Cited

U.S. PATENT DOCUMENTS

| 4,592,638 | A | * | 6/1986 | Kaneda et al. ............. 396/80 |
| 5,282,045 | A |   | 1/1994 | Mimura et al. ............ 358/227 |
| 5,771,408 | A |   | 6/1998 | Mizukawa ................. 396/65 |
| 6,369,954 | B1 |  | 4/2002 | Berge et al. ............... 359/666 |
| 6,445,415 | B1 |  | 9/2002 | Olsson ..................... 348/345 |
| 6,567,126 | B1 |  | 5/2003 | Slatter et al. .............. 348/345 |
| 6,783,068 | B2 |  | 8/2004 | Hecht ...................... 235/435 |
| 2003/0142877 | A1 | * | 7/2003 | George et al. ............. 382/254 |
| 2005/0001924 | A1 | * | 1/2005 | Honda ..................... 348/348 |
| 2005/0088538 | A1 | * | 4/2005 | Nozaki et al. ............ 348/229.1 |
| 2005/0179809 | A1 | * | 8/2005 | Yagi et al. ................ 348/345 |
| 2007/0201858 | A1 | * | 8/2007 | Shiohara .................. 396/310 |

* cited by examiner

*Primary Examiner*—W. B. Perkey
*Assistant Examiner*—Warren K Fenwick
(74) *Attorney, Agent, or Firm*—Harrington & Smith, PC (57) ABSTRACT

A digital camera apparatus has a sensing surface that captures images at a first resolution. A derivative of the captured image is displayed at a viewfinder or stored in a memory, after encoding, with a second, generally lower resolution. The resolutions are related by a downscale ratio. A method for digitally imaging a scene includes providing an imaging lens and a digital image sensing surface such as a CCD sensing surface, and changing a focusing of the lens with respect to the sensing surface in correspondence with a variance of a parameter that relates a captured image at the sensing surface and another image deriving from the captured image. Preferably, the variance of the parameter is the downscale ratio. The focusing of the lens with respect to the sensing surface may be changed by changing the physical distance or by changing a shape of the lens, for example. Apparatus and computer program products are also detailed.

20 Claims, 5 Drawing Sheets

DEEPER DEPTH OF FIELD FOR VIDEO

TECHNICAL FIELD

The present invention relates to increasing depth of field in digital imaging devices that image a scene at a sensor and visually display the captured image with a resolution different than that of the sensor. It is particularly advantageous for use with digital video imaging devices.

BACKGROUND

It is known to focus a camera lens at a hyperfocal distance of a scene in order that the resulting image exhibit a greater depth of field. The hyperfocal distance is that distance at which objects between half the hyperfocal distance and infinity are in focus. Though the term "in focus" depends for a particular viewer on that viewer's visual acuity, the term is objective and well defined in the photographic arts. Specifically, an object is in focus if it is within the depth of field. Objects at only one point along an optical axis are precisely in focus at the image plane (film or charge-coupled device CCD sensing element), given a certain lens arrangement. Objects in front of or behind that point, within a certain range, are considered to be in focus if they are sufficiently sharp. The span of those ranges in front of and behind that one precisely focused point is the depth of field. When the lens is focused such that the near edge of the depth of field is one half the total length to the focal point, the lens is focused at the hyperfocal distance.

Technically, depth of field is the region where the size of the circle of confusion is less than the resolution of the human eye. Circles with a diameter less than the circle of confusion will appear to be in focus. The circle of confusion is a term relating to the fuzziest a point can be and still be called "in focus". The circle of confusion is often calculated as the largest circle on the film that will still be seen as a point when enlarged to 8"×10" and viewed from a normal viewing distance (2-3 feet). Generally, about 0.0026 mm is considered an "average" circle of confusion for traditional, non-professional film imaging (i.e., non-professional camera and photographer, print film, photo-store processing).

Figure 1:
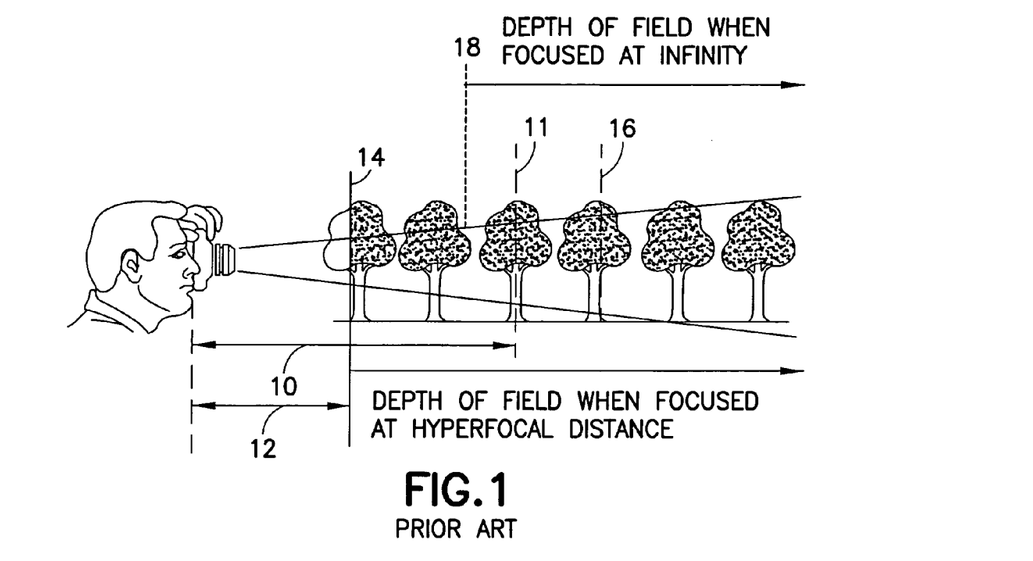
FIG. 1 is a schematic diagram showing a relationship between hyperfocal distance and depth of field.

Hyperfocal distance is schematically illustrated in FIG. 1. Where the camera is focused precisely on an object at the plane 11 (at the hyperfocal distance 10), all objects in the scene at a distance from half the hyperfocal distance 12 to infinity are considered to be in focus. Said another way, the near limit 14 of the depth of field when focused at the hyperfocal distance 10 occurs at one half 12 the hyperfocal distance, and that field extends to infinity. In FIG. 1, all tree trunks are in focus when the camera is focused at the hyperfocal distance 10, illustrated as the plane 11. Conversely, assume that the camera were focused at infinity (where light rays incoming to the camera lens may be considered parallel, typically about 20 feet and greater), such as schematically shown at the plane 16 in FIG. 1. The near limit of the depth of field is then further from the camera than for the hyperfocal case, and would lie for example at the plane 18 of FIG. 1. Since both depths of fields extend to infinity, focusing at the hyperfocal distance yields a greater depth of field than focusing at infinity. Hyperfocal distance is an important concept for maximizing depth of field in images of scenes that have both near and far field objects.

Certain other photographic parameters influence depth of field. Wider lenses exhibit shorter focal lengths and therefore deeper depths of field (e.g., an 18 mm lens will focus a deeper field than a 105 mm lens, all else being equal). Smaller aperture openings result in deeper fields (an f/16 aperture gives a greater depth of field than f/4 for the same lens, all else being equal).

U.S. Pat. No. 5,771,408, entitled "Fixed Focus Camera Shooting a Hyperfocal Distance" details a fixed focus camera arranged to mount an objective lens system and a diaphragm member on a common tube. The lens system provides fixed focus, and the diaphragm member has a rotating member that rotates to reduce light from the lens system. The tube and body are coupled so that rotation of the tube opens and closes the diaphragm member, and moves the lens system back and forth. When the diaphragm opening is reduced by rotating the tube, the objective lens system is moved forward to a position where the subject is captured at a hyperfocal distance. This enables the camera to perform shooting at a hyperfocal distance, whereby the minimum object distance for shooting can be shortened when the diaphragm opening is reduced.

The above patent describes a digital video camera in which the focal length is matched to the hyperfocal distance. However, in certain respects the image seen by a viewer is not the image captured by the camera. What is needed in the art is a method and apparatus to better match the image captured by a digital camera, including a digital video camera, with a derivative of that captured image that is actually displayed.

SUMMARY

The foregoing and other problems are overcome, and other advantages are realized, in accordance with the presently detailed embodiments of these teachings.

According to one embodiment, the invention is a method for digitally imaging a scene. The method includes providing a lens and a digital image sensing surface, and changing a focusing of the lens with respect to the digital image sensing surface in correspondence with a variance of a parameter that relates a captured image at the sensing surface with another image deriving from the captured image. In one embodiment, the variance of the parameter comprises a downscaling ratio between the image as captured and the image as either displayed, such as on a viewfinder, or the image as encoded and stored in a computer readable medium such as a volatile memory. Changing the focusing of the lens may be changing an optical distance between the lens and sensing surface, such as by moving them physically relative to one another or by changing a shape of the lens or a combination of these. A person skilled in the art appreciates that the term lens should be interpreted here widely to mean in its simplest form a single optical component, or a combination of several optical components having optical power. An imaging lens may work in transmittive or reflective manner, and it may be based on refractive or diffractive optical principles.

According to another embodiment, the invention is an apparatus that includes a digital sensing surface, an optical lens, means for changing an optical distance between the optical lens and the digital sensing surface, and a computer readable memory for storing data indicative of a relation between optical distance and downscale ratio. The apparatus further includes a processor coupled to each of the memory, the means for changing the optical distance, and the digital sensing surface. The processor is for operating the means for changing the optical distance according to the stored relation.

According to another embodiment, the invention is a program of machine-readable instructions, tangibly embodied on an information bearing medium and executable by a digital data processor, to perform actions directed toward changing a focusing of a lens with respect to a sensing surface. The specific actions include correlating changes to the optical distance with variance of a parameter that relates an image captured at the sensing surface to another derivative image. Preferably, the variance of the parameter comprises a downscale ratio.

According to another embodiment, the invention is an apparatus that includes means for focusing incoming light rays, such as an optical lens; and means for capturing an image from said incoming light rays, such as a CCD sensing surface. The apparatus also includes means for dynamically changing an optical distance between the means for focusing and the means for capturing, such as, for example, mechanical linkage for moving the lens along an optical axis, or a voltage source with leads for applying a voltage to a liquid lens that changes shape as a function of applied voltage. The apparatus further has means for storing data indicative of a relation between the optical distance and a downscale ratio, such as a computer readable volatile memory. The apparatus further includes control means, such as a digital processor, for operating the means for dynamically changing the optical distance in accordance with the data that is indicative of the relation.

Other various aspects, embodiments, and adaptations of the invention are disclosed in detail below.

BRIEF DESCRIPTION OF THE DRAWINGS

The foregoing and other aspects of these teachings are made more evident in the following Detailed Description, when read in conjunction with the attached Drawing Figures, wherein.

DETAILED DESCRIPTION

In film photography, the image is captured on film that the viewer sees directly. The same is not true in digital photography; the image is captured at a sensing surface (an array of pixels of a CCD), and converted either via a projector or display panel to the image actually viewed. A person generally does not see an image exactly as captured at a digital sensing surface. While the above patent for a fixed focus camera describes imaging video on a CCD sensing surface, it does not recognize that a disparity may exist between the captured image and the viewed image. A disparity exists because the image as viewed undergoes some manipulation from the image captured at the sensing surface to account for the difference in resolution between the sensor and the display. Some of that disparity results from image downscaling. Consider a prior art digital camcorder, where the scene is captured at a CCD sensing surface and shown in real time at a flat-panel digital viewfinder. The viewfinder generally enables a lower resolution than the CCD sensing surface, which is accounted for in a downscaling ratio. Even where the displayed image is zoomed to reflect a one-to-one downscaling ratio as compared to the captured image, some downscaling still occurs when storing the captured images for later display, such as on a computer readable medium (memory stick, optical disk, etc.), because the stored images are encoded versions of the captured ones. In each case, prior art digital cameras may be adapted to optimize the scene for a hyperfocal distance as captured at the sensing surface, but downscaling negates that optimization for the image as viewed through the viewfinder or as later reconstructed from a compressed and stored medium. The present invention is directed toward resolving the disparity between images captured at the sensing surface and viewed or recorded images, and particularly is directed toward providing a greater depth of field for the digital images as displayed or recorded as compared to the digital image as captured at a sensing surface. In other words, an aspect of the invention is related to the fact that best fixed focus for a megapixel image resolution is not necessarily the same than for a significantly downscaled image resolution. Therefore, if the user selects a different downscaling ratio for example for video, then the fixed focusing should be effected according to the selected downscaling ratio in order to optimize the depth of field of the viewed or recorded image.

Digital photography uses an array of pixels (e.g., photodiodes) along the sensing surface. A CCD is commonly used as the device on which the image is captured, though others, such as complementary metal-oxide semiconductor CMOS sensors, may be used without departing from the teachings herein. Digital cameras, whether enabled for video or only still photography, may be stand-alone devices or may be incorporated in other handheld portable devices such as cellular telephones, personal digital assistants, BlackBerry® type devices, and others. Incorporating them into devices that enable two-way communications (generally termed mobile stations herein) offer the advantage of emailing photos or video clips via the Internet. Increasingly, digital cameras may take still photos or video, the length of the video that may be recorded generally limited by available memory in which to store it. If desired, the current invention can also be applied to non-portable imaging or camera devices.

To define the hyperfocal distance for a particular camera, a value for circle of confusion has to be determined. This is where the disparity in hyperfocal distance arises, because hyperfocal distance (and therefore depth of field) depends on the size of the circle of confusion. In the CCD sensing surface, the circle of confusion may be one size based on the number of pixels in the array, whereas the circle of confusion in a viewfinder with a less extensive array for displaying the image is necessarily larger. Using a hyperfocal distance that is based on the size of the circle of confusion for the CCD sensing surface by definition results in an object, which lies at a position half the CCD-based hyperfocal distance (where the depth of field begins), being in focus as captured in the CCD array. But the display (viewfinder) typically has a lower resolution than the CCD sensing surface and therefore a larger circle of confusion. That same object at the near end of the CCD depth of field will be out of focus when displayed on the lower resolution viewfinder. The depth of field experienced by the user in the above situation is not optimized for the actual circle of confusion size that the viewer sees.

Typically, a Bayer sensor is used in the CCD sensing array, in which different color filters are disposed over different pixels of the sensor array to create a color image. Monochromatic light sensed by each sensor is then recombined with the aid of a de-mosaicing algorithm to construct a composite multi-color image. The circle of confusion (CoC) for a Bayer matrix image is given by the following equation:

$$CoC = N * \text{pixel size} \quad [1]$$

The variable N=(downscale ratio+1) where the original image at the sensor is downscaled to a display with lesser resolution. Assume the typical case where the image displayed on the viewfinder is of smaller resolution than that captured at the Bayer sensor. The image displayed on the viewfinder or recorded for later printing or displaying then must undergo downscaling as compared to the captured image in order to be displayed or recorded. Where a zoom function of the camera is used, downscaling also occurs in that the displayed image is first cropped and then downscaled (though additional interim steps are imposed to smooth the zooming operation). At full zoom, the downscaling ratio may be 1:1; one display pixel represents one sensing surface pixel (though other portions of the captured image are cropped and not displayed). In the prior art known to the inventor, downscaling is facilitated either by not moving the camera lens, or by foregoing any auto focus functionality of the camera. In the present invention, the lens is moved to a position that corresponds to the downscaling ratio, in order to enhance depth of field. Preferably, this position is the hyperfocal distance that is optimized for the displayed/recorded image rather than the captured image. In video, the lens may be moved to the (display optimized) hyperfocal distance corresponding to the downscaling ratio as that downscaling ratio changes with zooming of the lens.

The hyperfocal distance $H_d$ is determined according to equation [2] below:

$$H_d = \frac{f^2}{(CoC)(F\#)} \quad [2]$$

where f is the focal length, CoC is the circle of confusion, and F# is the camera F stop number or aperture size.

Assume for example that a camera has a sensor array of (approximately) 2M pixels (1600 horizontal lines of pixels by 1200 vertical lines of pixels), with a 3.3 µm (micrometer) pixel size. The lens focal length is 5.5 mm with F-number 2.8. Assume further that this example camera has an optical zoom capability, and that the display or encoded video enables resolution one half that of the image as captured at the CCD sensing surface. To set the hyperfocal distance according to the present invention, given the one-half resolution disparity, set the base CoC to be two times the pixel size (N=2), or 6.6 µm. Other values may be used, preferably predicated on the disparity between display (or encoded and stored video resolution) and the CCD sensing surface resolution. The hyperfocal distance is then given by equation [2] as $H_d$=1627 mm.

Figure 3A:
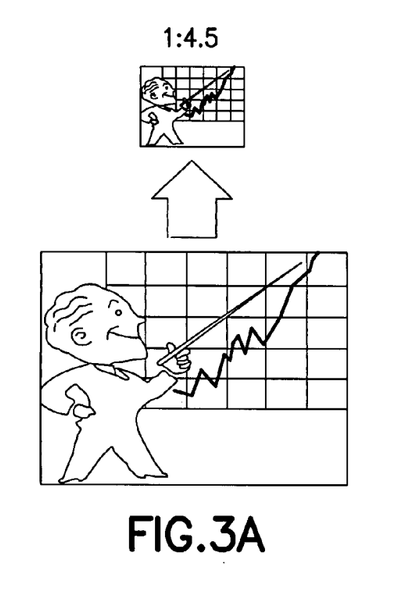
FIG. 3A-3C illustrate in the lower field an image as captured at a CCD sensing surface and in the upper field the corresponding image as displayed with a downscaling ratio that varies among FIGS. 3A-3C.
Figure 3B:
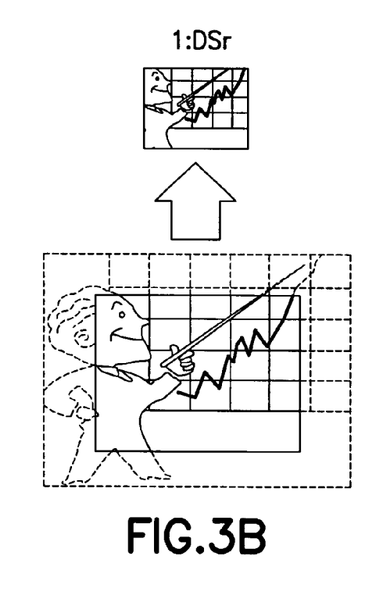
Figure 3C:
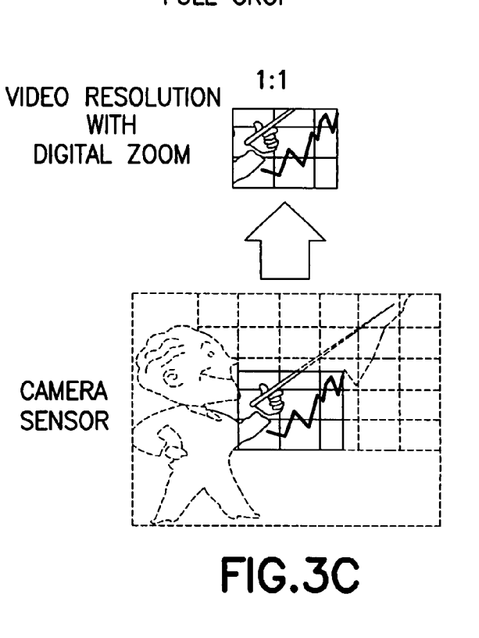

Now calculate for a different downscale image size for correspondingly larger CoCs, as in FIGS. 3A-3C. The lower portion of FIGS. 3A-C illustrate the image as captured at the CCD sensing surface (dotted outline in FIGS. 3B-3C indicates the captured image), and the upper portion illustrates the image as displayed on a viewfinder or as reproduced from a storage media. In the full view display of FIG. 3A, the displayed image is the same image as that captured, with the lower resolution corresponding to the lower resolution available at the viewfinder (or from encoding/compression generally incurred when converting to a stored media file). Known in the art are a series of common interchange formats CIF for standard downscaling ratios, by which a CCD camera sensor is matched to a viewfinder display (or by which the captured image is reduced via compression for storage). FIG. 3A illustrates a CIF of 1:4.5, where 4.5 pixels of the digital camera sensor (CCD array) are represented by one pixel in the viewfinder. This is because the viewfinder uses an array of 352 horizontal pixels by 288 vertical pixels to display the image captured by the 1600*1200 pixel array of the sensor (1600/352≈4.5). The borders of the displayed and captured images are the same in FIG. 3A (though some negligible cropping may occur to more precisely map the 1600*1200 sensor pixels to the 352*288 display pixels in a 1:4.5 ratio).

FIG. 3C illustrates a digital zoom to the extent of what is termed a full crop. A full crop occurs where one display pixel represents one pixel of the camera sensor. While digital manipulation may allow the viewfinder to display an even smaller segment of the image as captured at the sensor, such a display would necessarily use more than one pixel at the display to represent only one pixel from the sensor, meaning degraded resolution as compared to a full crop. As used herein, full crop represents a 1:1 downscale ratio, though some variation is allowable such as to conform aspect ratios between the CCD sensor and the display so long as those variations have negligible effect on the size of the circle of confusion. In the full crop of FIG. 3C, the displayed image at the viewfinder represents only a contiguous subset of the pixels in the camera sensor (essentially 352*288 of the sensor pixels in this example), so the captured image at the sensor is cropped to the maximum extent possible (without diminishing resolution). Pixels of the sensor that lie outside those represented at the display (the upper portion of FIG. 3C) are disregarded.

FIG. 3B illustrates some intermediate CIF, where the camera is zoomed to an intermediate position and the image is cropped (less than fully) so that one pixel of the display represents more than one pixel of the sensor. The downscaling ratio for any intermediate position in this example is then 1:x, where x is between 4.5 (the maximum downscaling ratio) and 1 (fully cropped).

Figure 4:
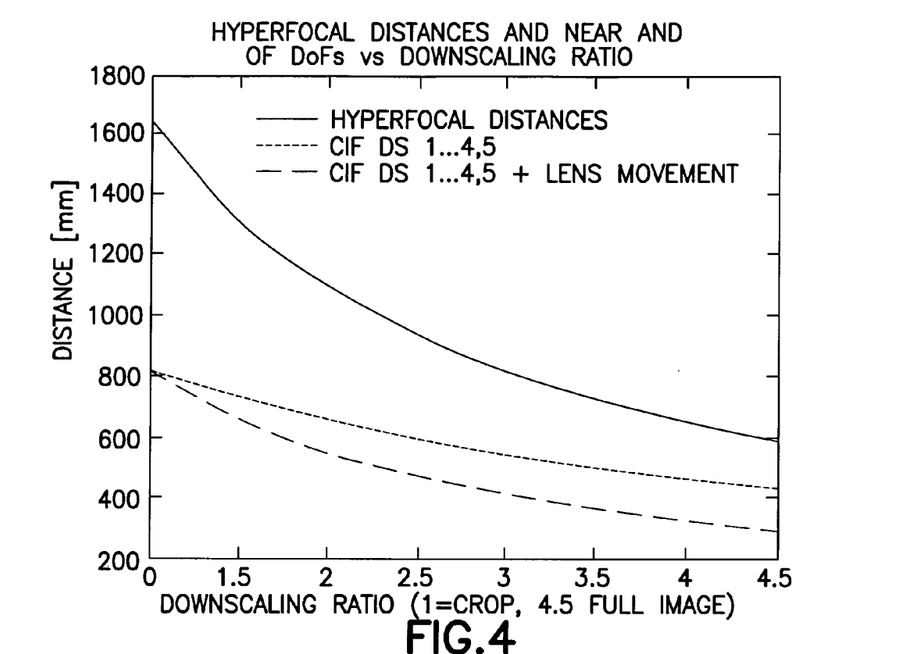
FIG. 4 is a graph showing a relation between hyperfocal distance and downscaling ratio that is derived from the teachings of the present invention.

The CoCs for various zoom positions are calculated by multiplying the base CoC with the downscaling ratio. With these CoCs, hyperfocal distances are generated as illustrated in the graph of FIG. 4, and in Table 1 below. The uppermost line of FIG. 4 shows hyperfocal distance optimized for the downscaled displayed image, the lowermost line shows the near end of the depth of field (half the hyperfocal distance of the uppermost line), and the central plot line shows where the near end of the depth of field would be without optimizing DoF for downscaling. The relevant data of FIG. 4 or Table 1 may be stored in a computer readable memory of a digital camera or a device in which a digital camera component is disposed to set the focal length of the lens at the hyperfocal distance given the display resolution and the downscaling ratio used to display the image at various lens zoom positions.

TABLE 1

Depth of Focuses.

Nearest Point of Depth of Field

| Scaling Factor | Lens in 2M Hyperfocal Position (1637 mm) | Lens moved according to scaling factor | DoF increase (mm) |
| --- | --- | --- | --- |
| 1 | 820 | 820 | 0 |
| 1.5 | 729 | 656 | 73 |
| 2 | 656 | 547 | 109 |
| 2.5 | 597 | 469 | 128 |
| 3 | 547 | 411 | 136 |
| 3.5 | 505 | 365 | 140 |
| 4 | 469 | 329 | 140 |
| 4.5 | 438 | 299 | 139 |

The near end of the depth of field may be computed, when the lens is set to the hyperfocal distance optimized for the full (uncropped) sensor, by the following, where CoC=pixel size* (downscale factor+1) and the downscale factor is the ratio of sensor resolution to displayed resolution:

$$nDoF = \frac{H_{full\_sensor} f^2}{f^2 + F\#CoC(H_{full\_sensor} - f)} \quad [3]$$

The lens track is then:

$$lensposition = \frac{H_{scaled} f}{H_{scaled} - f} \quad [4]$$

Figure 2:
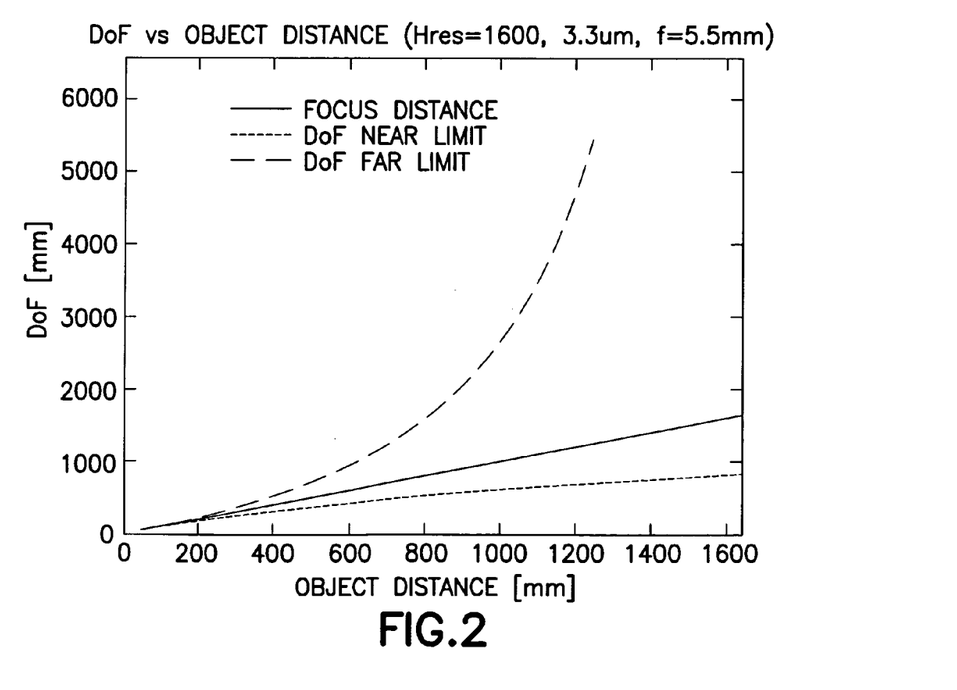
FIG. 2 is a graph of depth of field limits and focal distance for a displayed image as might be exhibited by a camera according to the prior art.
Figure 5:
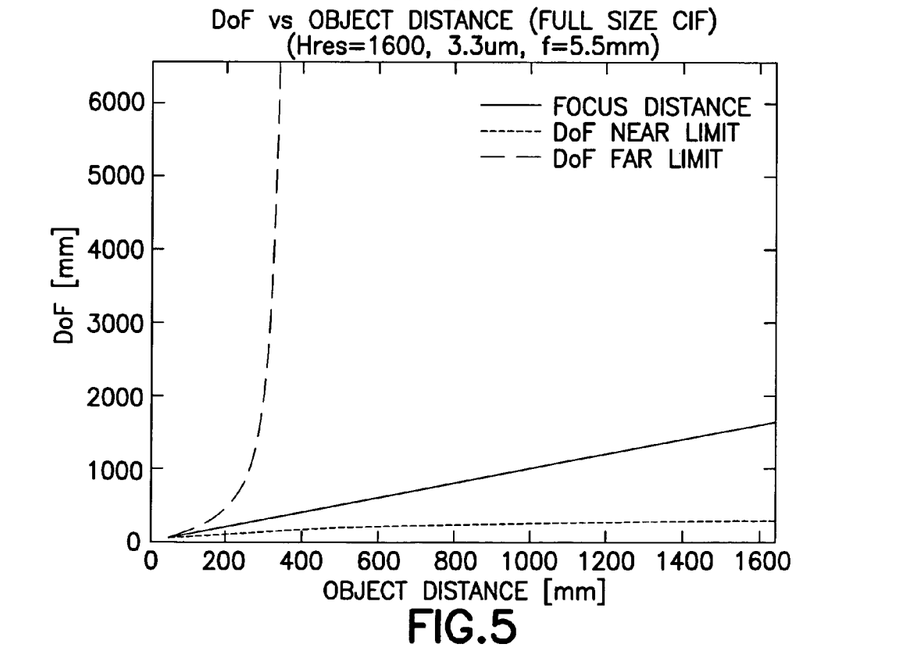
FIG. 5 is a graph similar to FIG. 2 but showing depth of field limits for a displayed image as exhibited by a camera according to an embodiment of the invention.

FIG. 2 is a graph of depth of field limits and focal distance for a displayed image as might be exhibited by a camera according to the prior art, optimized for resolution of the sensing surface. FIG. 5 is a graph similar to FIG. 2 but showing depth of field limits for a displayed image as exhibited by a camera according to an embodiment of the invention, optimized for resolution of the display. The central plot line represents focus distance. Both FIGS. 2 and 5 represent a camera CCD sensing surface of 1600*1200 pixels, a pixel size of 3.3 μm, and a focal distance of 5.5 mm. Notice the increase in the near limit to the depth of field in FIG. 5 as compared to FIG. 2.

It is noted that at very close object distances, the central plot line of focus distance is not a hyperfocal distance because the far limit does not extend to infinity (a necessity by the definition of hyperfocal distance). That central plot line represents the hyperfocal distance only where the far limit of the depth of field approaches infinity. Note that the object distance at which the focus distance becomes a hyperfocal distance is also significantly closer in FIG. 5 as compared to FIG. 2. However, improvements to both the near and far limits to the depth of field exist, according to embodiments of the present invention as illustrated in FIG. 5, at focal lengths where objects at infinity are not in focus. Thus, embodiments of the invention may adjust a lens to optimize or adapt a focal distance, that is not a hyperfocal distance, to enhance depth of field. At least for very short focal lengths and object distances, the enhanced depth of field does not extend to infinity.

Figure 6:
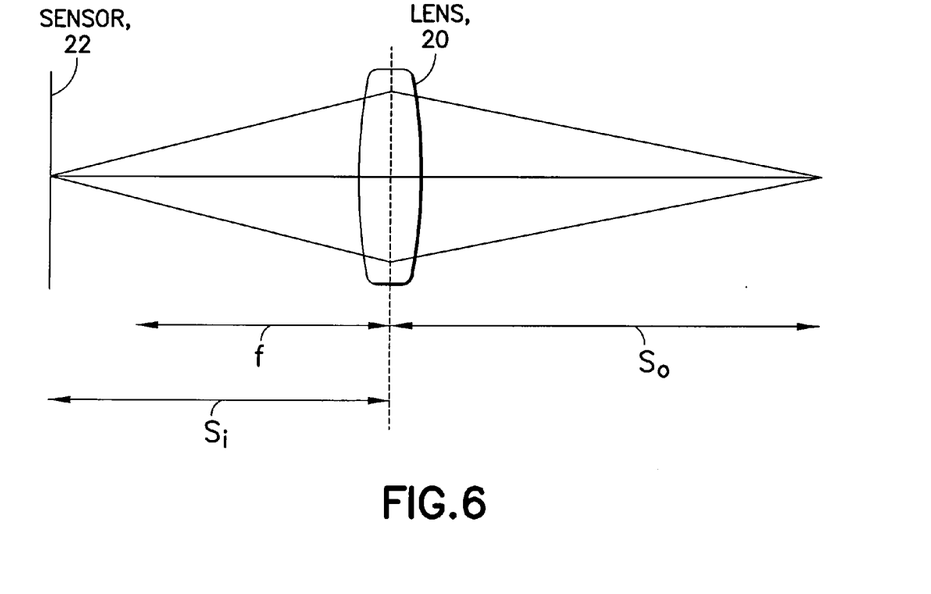
FIG. 6 is a schematic diagram of a lens in relation to a sensing surface illustrating various parameters used in describing the invention.

It is clear from FIGS. 3A-3C that the position of the lens (the extent of zoom) determines downscaling ratio, given the hardware constraints of sensor and display resolution. [It may be partially a software constraint when considering relative resolution of sensor versus encoded and stored images from the sensor, depending upon the encoding algorithm.] FIG. 6 illustrates in schematic view a lens 20 in relation to a CCD sensing surface 22 to define terms. The lens focal length f is fixed for a given lens structure, and is that distance from the lens at which incoming parallel light rays (e.g., from an object at a distance of infinity) are focused. An object located at an object distance $s_o$ is focused at the distance $s_i$ on the opposite side of the lens 20. In FIG. 6, the image distance $s_i$ is also the spacing between the CCD sensing surface 22 and the lens 20. FIG. 6 assumes a thin lens in air, so that assumptions underlying the well-known lensmaker's formula (also known as the thin lens equation) remain valid. The position of the lens 20 may be found using the lensmaker's formula:

$$s_i = \frac{s_o f}{s_o - f} \quad [5]$$

For circumstances (refractive index of medium not equal to one) or lenses for which those assumptions (air, thin lens, bi-convex, etc.) are not valid, modifications within normal skill in the art may be made to the above formulation to account for the differences. In equation [5], the hyperfocal distance $H_d$ is set as the object distance $s_o$.

The lens trajectory, i.e. the lens position (offset from the lens focal length f) plotted against downscaling ratio can be calculated using equation [5], where hyperfocal distance $H_d$ is seen as the object distance. Such lens trajectory data may be stored in a computer readable medium of a camera or a device in which a digital camera is disposed, and accessed by a processor to set lens position in response to a downscaling ratio that is necessitated by a certain zoom of the lens by a user.

The advantage gained by embodiments of the present invention as compared to the prior art can be seen from the two lower plot lines of FIG. 4. In the upper one of said two plot lines of FIG. 4, representing prior art, the lens is fixed (unchanged focal length, about 1637 mm) while the display is changed between a 1:1 downscale ratio to a 1:4.5 downscale ratio. As previously, the underlying digital camera has a 2M pixel array at the CCD sensing surface and downscaling at the viewfinder or encoded and stored image varies between 1:1 and 1:4.5. The near limit of the depth of field is shown along the vertical axis. The lower one of said two plot lines of FIG. 4 shows the identical camera, but with moving the lens now according to equation [5] as the downscaling ratio changes. In the full view CIF (1:4.5 ratio, see FIG. 3A), the near limit of the depth of field exhibits the greatest improvement over the prior art, moving from about 440 mm to about 300 mm (for accurate values see the lowest line in Table 1). It can be seen from table 1 that the greatest rate of improvement in depth of field increase is taking place between 1:1 and about 1:2 downscaling ratios, with improvement continuing at a relatively constant or mildly declining rate for downscaling ratios above about 1:2.

Embodiments of the present invention then offer some or all of the following advantages, as compared to the described prior art: deeper depth of field; less necessity to require auto focus, thus avoiding auto focus difficulties such as low light conditions; lower power consumption as compared to auto focus. Additionally, aspects of the present invention are relatively easy to implement, as will be described with reference to FIG. 9. Specifically, a software upload to a digital camera device may be all that is necessary providing the camera is already equipped with a moveable lens controllable by a processor.

Figure 7:
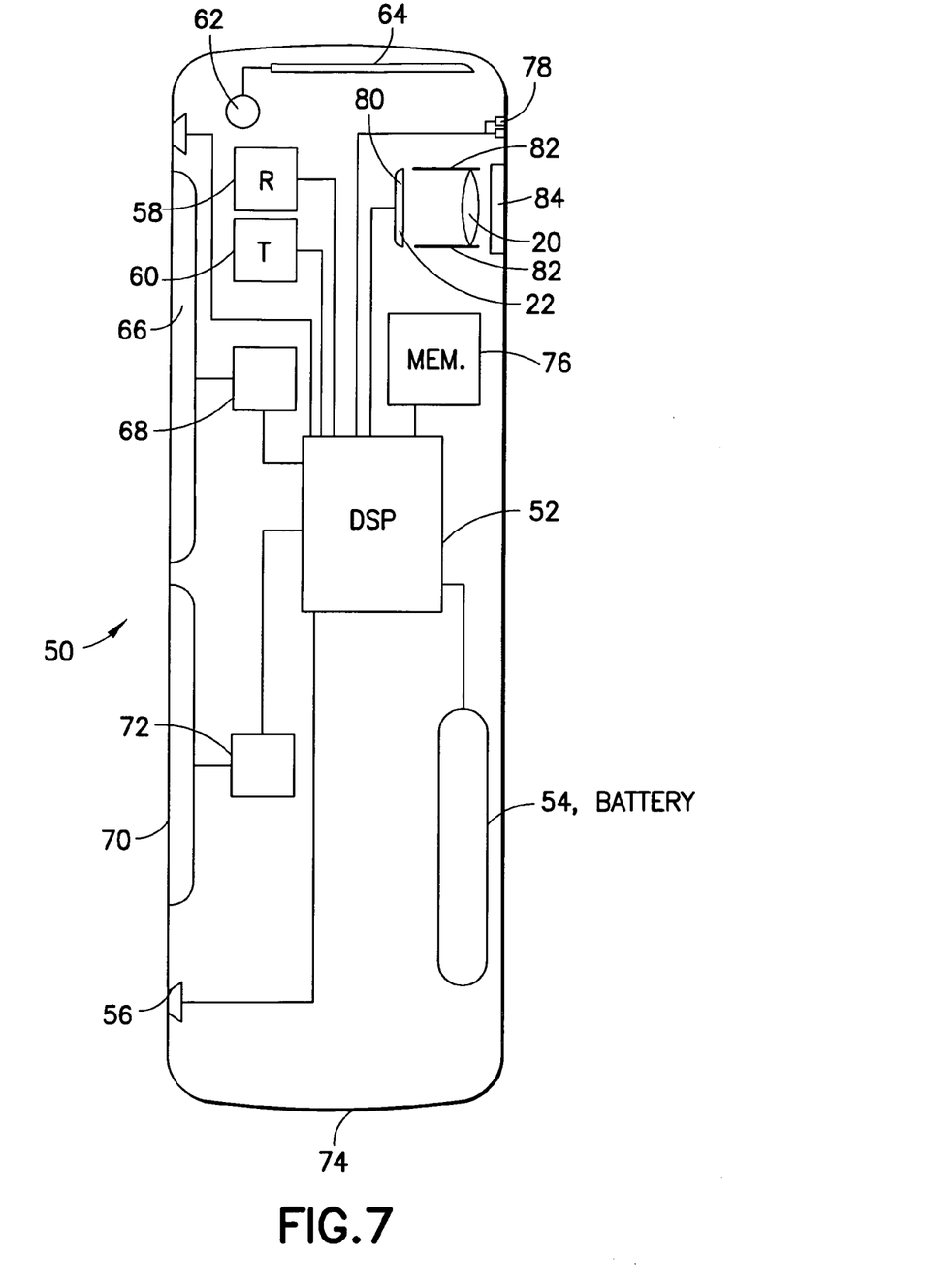
FIG. 7 is a schematic block diagram showing a video camera according to the present invention disposed within a mobile station.

FIG. 7 is a sectional schematic block diagram of a mobile station MS 50, such as a cellular telephone, a personal digital assistant with two-way communications capability, or any other handheld portable device of similar functionality. The MS 50 includes a digital signal processor DSP 52, powered by a galvanic power source such as a battery 54 and coupled to transducers (speaker, not shown, and) 56 (microphone). Receiving circuitry 58 and transmitting circuitry 60 are coupled through a switch or dipole filter 62 to one or more antennas 64. A graphical display interface 66 by which a user views text and images is controlled by a display driver 68. Similarly, a user input pad 70, such as may include buttons, joysticks, and/or touch sensitive areas, is controlled by an input driver 72. The display interface 66 may be fixed relative to the main housing 74 as illustrated, or may be hinged to extend from the main housing 74 as is common with digital camcorders. Regardless of the particular embodiment, the graphical display interface displays images according to the downscale ratios detailed above.

Computer programs for operating the various sub-systems of the MS 50 are stored in a memory 76, which may be a combination of volatile and non-volatile storage media for data and programs, possibly dispersed among various spatial locations within the housing 74. Various other buffers, filters, encoders and the like are also within the housing 74, but peripheral to the invention. One or more detectors 78 penetrate the housing 74 and are used to measure object distances such as for autofocus functionality when the DSP 52 is in condition to take a picture (capture an image). When in such a condition, the DSP provides a pre-charge to pixels on a pixilated array that form a sensing surface 22 at which an image of a scene is electronically captured. The displayed or recorded image is often downsized as compared to that captured image. The surface 22 may be directly mounted to a readout integrated circuit ROIC 80 or merely coupled electronically. The ROIC 80 may control each pixel individually, it may control them according to rows, or it may control them according to contiguous groupings.

A lens 20 is mounted to upper and lower rails 82 and translates along the optical axis of the lens 20 by use of mechanical linkage. Such mechanical linkage is well known in the art for manually or automatically changing a focal length of a conventional camera lens. The distinction over a conventional auto focus camera lens is that the linkage operates to move the lens according to a downscale ratio/lens position relation that is stored in the memory 76. A window 84 is aligned with the lens 20 and allows light from a scene to pass through the housing 74 and the lens 20 to expose various pixels of the surface 22. A computer program to operate the mechanical linkage in correlation with the data stored in memory that is indicative of the relation between the captured image resolution and the displayed (or encoded and stored) image resolution is stored in the memory 76 and executed by the DSP 52. The memory 76 may also store the encoding algorithm and stored the encoded image frames.

FIG. 7 illustrates only one embodiment, the rest of which will be obvious given the above detailed description. The mechanical linkage along the rails 82 may move the lens 20 relative to the housing 74, may move the sensing surface 22 relative to the housing 74, or may move both to effect a distance between them that is represented by the relation between lens position and downscale ratio, as illustrated graphically at FIG. 7. Lens position may alternatively be controlled to correspond to some other relation between the image as captured at the sensing surface 22 and the displayed or encoded/stored image deriving from that captured image, apart from the described downscale ratio. The camera portions of the MS 50 may be a stand-alone camera such as a video camera operating with the stored relation between lens position and downscale ratio as above, or may be a component disposed within a mobile station or other portable multifunction device. Optical zoom may be controllable by a joystick or button(s) disposed on the user input pad 70.

In certain embodiments, the effect similar to moving the lens(es) and/or sensing surface may also be accomplished using a liquid lens or other techniques, where the focal length of the lens itself is changed by changing the shape or refraction index of the optical material of the lens(es). U.S. Pat. No. 6,369,954 describes an optical lens having two liquids with different optical indices, one being conductive and one being non-conductive. The image distance is changed by applying a voltage to the conductive liquid, which then changes shape so that the focal length of the lens itself is changed. In the liquid lens arrangement of the U.S. Pat. No. 6,369,954, a first image distance arises from a first lens shape. A second image distance arises from a second lens shape, even though the first and second image distances behind the changed lens at which light from different object distances is focused may be identical. This is true because it is the shape of the lens itself that changes, effectively changing the image distance. The same result holds where the refractive index of the lens or some medium between the lens and the sensor is changed, or other embodiments that avoid or reduce the necessity of moving the lens and sensor components relative to one another. In all cases, it is the optical distance between the lens and the sensing surface that is changeable; in one case by changing the physical distance, in another by changing the lens shape. Moving a traditional lens relative to the sensing surface, or changing the lens shape or refractive index, or changing the refractive index of some medium between the lens and sensing surface, are all ways to change the optical distance between the lens and the sensing surface so as to maintain the sensing surface at different effective image distances.

Although described in the context of particular embodiments, it will be apparent to those skilled in the art that a number of modifications and various changes to these teachings may occur. Thus, while the invention has been particularly shown and described with respect to several embodiments thereof, it will be understood by those skilled in the art that certain modifications or changes may be made therein without departing from the scope and spirit of the invention as set forth above, or from the scope of the ensuing claims.

What is claimed is:

1. A method for digitally imaging a scene comprising:
   providing an imaging lens and a digital image sensing surface for receiving light through the lens;
   changing an optical distance between the lens and sensing surface such that a hyperfocal distance varies with a downscale ratio that relates a captured image at the sensing surface and another image deriving from the captured image.

2. The method of claim 1, wherein the another image comprises an image displayed at a visual display interface.

3. The method of claim 2 wherein the visual display interface comprises a viewfinder.

4. The method of claim 1, wherein the another image comprises an image encoded and stored on a digital storage medium.

5. The method of claim 1 for digitally displaying a video scene.

6. The method of claim 1 wherein changing the optical distance between the lens and the sensing surface comprises moving the lens relative to the sensing surface.

7. The method of claim 1 wherein changing the optical distance between the lens and the sensing surface comprises changing a shape of the lens.

8. An apparatus comprising:

a digital sensing surface;

an optical lens;

means for changing an optical distance between the optical lens and the digital sensing surface;

a computer readable memory for storing data indicative of a relation between the optical distance and downscale ratio in which, for at least some downscale ratios, the optical distance corresponds to a hyperfocal distance; and a processor coupled to the memory, to the means for changing the optical distance, and to the digital sensing surface, said processor for operating the means for changing an optical distance to vary the optical distance according to the stored relation.

9. The apparatus of claim 8, wherein the means for changing an optical distance comprises mechanical means for moving the lens relative to the sensing surface along the optical axis.

10. The apparatus of claim 8, wherein the means for changing an optical distance comprises a voltage source and leads for applying a voltage to a liquid lens that changes shape responsive to an applied voltage.

11. The apparatus of claim 8, further comprising a display interface coupled to the processor for displaying an image deriving from the sensing surface according to the downscaling ratio.

12. The apparatus of claim 11 wherein the display interface comprises a viewfinder.

13. The apparatus of claim 8, wherein the memory is further for storing an encoding algorithm; and the processor is further for executing the encoding algorithm on an output of the digital sensing surface and storing said algorithm in said memory.

14. A mobile station comprising:

a digital sensing surface;

an optical lens;

means for changing an optical distance between the optical lens and the digital sensing surface;

a computer readable memory for storing data indicative of a relation between the optical distance and downscale ratio; and a processor coupled to each of the memory, the means for changing the optical distance, and the digital sensing surface, said processor for operating the digital sensing surface to capture a video image and for operating the means for changing an optical distance to vary the optical distance according to the stored relation.

15. A program of machine-readable instructions, tangibly embodied on an information bearing medium and executable by a digital data processor, to perform actions directed toward changing an optical distance between an optical lens and a sensing surface, the actions comprising:

correlating movement of a lens relative to a sensing surface of a digital image capturing component so as to vary a hyperfocal length with a downscale ratio that relates an image captured at the sensing surface and a derivative image deriving from the image captured at the sensing device.

16. The program of machine readable instructions of claim 15, wherein the derivative image comprises an image displayed at a visual display interface.

17. The program of machine readable instructions of claim 15, wherein the derivative image comprises a viewfinder.

18. The program of machine readable instructions of claim 15, wherein the derivative image comprises an image encoded and stored on a digital storage medium.

19. The program of machine readable instructions of claim 15, wherein movement of the lens relative to the sensing surface is actuated by electronically changing a shape of the lens.

20. The program of machine readable instructions of claim 15, executable in conjunction with optical zooming of the lens during capture of a video image at the sensing surface.

* * * * *